United States Patent
Tan et al.

(10) Patent No.: US 12,456,728 B2
(45) Date of Patent: Oct. 28, 2025

(54) METHOD FOR PRODUCING HIGH NICKEL LITHIATED METAL OXIDE FOR BATTERY

(71) Applicant: Pacific Industrial Development Corporation, Ann Arbor, MI (US)

(72) Inventors: Bing Tan, Ann Arbor, MI (US); Yuhao Liao, Ann Arbor, MI (US); Andrew Rajewski, Clinton, MI (US); Jeffery Lachapelle, Northville, MI (US); Wei Wu, Ann Arbor, MI (US)

(73) Assignee: Pacific Industrial Development Corporation, Ann Arbor, MI (US)

( * ) Notice: Subject to any disclaimer, the term of this patent is extended or adjusted under 35 U.S.C. 154(b) by 660 days.

(21) Appl. No.: 17/869,851

(22) Filed: Jul. 21, 2022

(65) Prior Publication Data

US 2023/0036486 A1 Feb. 2, 2023

Related U.S. Application Data

(60) Provisional application No. 63/227,483, filed on Jul. 30, 2021.

(51) Int. Cl.
 *H01M 4/525* (2010.01)
 *H01M 4/02* (2006.01)
 (Continued)

(52) U.S. Cl.
 CPC ......... *H01M 4/525* (2013.01); *H01M 4/0471* (2013.01); *H01M 4/485* (2013.01);
 (Continued)

(58) Field of Classification Search
 CPC .... H01M 4/525; H01M 4/0471; H01M 4/485; H01M 4/505; H01M 10/0525; H01M 2004/028
 See application file for complete search history.

(56) References Cited

U.S. PATENT DOCUMENTS

| 2015/0072232 A1* | 3/2015 | Nagai | H01M 4/505 |
|---|---|---|---|
| | | | 429/231 |
| 2018/0019464 A1* | 1/2018 | Xia | H01M 4/366 |
| (Continued) | | | |

FOREIGN PATENT DOCUMENTS

| CN | 104051709 A | * | 9/2014 | ........ H01M 10/0525 |
| CN | 112125353 A | * | 12/2020 | ............ C01G 53/44 |
| (Continued) | | | | |

OTHER PUBLICATIONS

Machine Translation of CN-112125353-A (Mar. 3, 2025) (Year: 2025).*

(Continued)

*Primary Examiner* — Matthew J Merkling
(74) *Attorney, Agent, or Firm* — Dickinson Wright PLLC

(57) ABSTRACT

A method for preparing high nickel lithiated metal oxides that includes selecting one or more nickel precursors; at least one non-corrosive lithium salt; and a plurality of metal oxide or hydroxide precursors. The metal precursors and lithium salts are mixed together to form a mixture comprising:

$$Li_xNi_yM_zN_{(1-y-z)}O_{(2-a)}F_a \qquad (F-1)$$

wherein $x=1.0\text{-}1.1$, $0.80 \leq y \leq 0.90$, $0.03 < z \leq 0.15$, and $0 \leq a \leq 0.05$; M is Co or Fe; and N is Al, Mn, Fe, Ca, Mg, Ti, Cr, Nb, Mo, W, B, or a mixture thereof provided N may be Fe when M is Co. The mixture is subjected to sintering (1st step) in air at $\geq 750°$ C. to form a powder. The powder is subjected to a $2^{nd}$ sintering step in $O_2$ at $\leq 750°$ C. to form the high nickel lithiated metal oxides.

16 Claims, 4 Drawing Sheets

(51) Int. Cl.
    H01M 4/04    (2006.01)
    H01M 4/485    (2010.01)
    H01M 4/505    (2010.01)
    H01M 10/0525    (2010.01)

(52) U.S. Cl.
    CPC ....... H01M 4/505 (2013.01); H01M 10/0525 (2013.01); *H01M 2004/028* (2013.01)

(56) References Cited

U.S. PATENT DOCUMENTS

| | | | | |
|---|---|---|---|---|
| 2020/0235389 A1* | 7/2020 | Pullen | ................... | H01M 4/525 |
| 2020/0373560 A1 | 11/2020 | Campbell et al. | | |
| 2021/0143423 A1* | 5/2021 | Paulsen | ................. | H01M 4/505 |
| 2022/0255066 A1* | 8/2022 | Pan | ................... | H01M 10/0525 |

FOREIGN PATENT DOCUMENTS

| | | | |
|---|---|---|---|
| KR | 20180027261 A | * | 3/2018 |
| WO | 2020171366 A1 | | 8/2020 |

OTHER PUBLICATIONS

Machine Translation of CN-104051709-A (Mar. 3, 2025) (Year: 2025).*

Machine Translation of KR-20180027261-A (Mar. 3, 2025) (Year: 2025).*

Ge Wujie et al: "Effects of reheating temperature on the structure, morphology and electrochemical performance of Ni-rich cathode materials," Journal of Alloys and Compounds, vol. 876, Apr. 24, 2021.

Park Nam-Yung et al: "Optimized Ni-rich NCMA cathode for electric vehicle batteries," Advanced Energy Materials, vol. 11, No. 9, Jan. 18, 2021, p. 2003767.

Yan Wuwei et al: "Synthesis of single crystal $LiNi_{0.92}Co_{0.06}Mn_{0.01}Al_{0.01}O_2$ cathode materials with superior electrochemical performance for lithium ion batteries," Journal of the Electrochemical Society, Aug. 12, 2020, p. 120514.

Bianchini, Matteo et al., Lithium-Ion Batteries, "There and Back Again—The Journey of $LiNiO_2$ as a Cathode Active Material," Angewandte Chemie Int. Ed. 2019, 58, 2-27, Intl. Ed. DOI: 10.1002/anie.201812472, 26 pgs.

Julien, Christian M. et al., Energies, "NCA, NCM811, and the Route to Ni-Richer Lithium-Ion Batteries," Institut de Mineralogie, de Physique des Materiaux et de Cosmologie (IMPMC), Sorbonne Universite, CNRS-UMR 7590, 4 Place Jussieu, 75252 Paris, France, 2020, 13, 6363; DOI: 10.3390/en13236363, 46 pgs.

Kalyani, P. et al., Elsevier, "Various Aspects of $LiNiO_2$ Chemistry: A Review," Science and Technology of Advanced Materials 6 (2005) 689-703, DOI: 10.1016/j.stam. 2005.06.001, 15 pgs.

* cited by examiner

METHOD FOR PRODUCING HIGH NICKEL LITHIATED METAL OXIDE FOR BATTERY

CROSS REFERENCE TO RELATED APPLICATIONS

This application claims the benefit of the filing date under 35 U.S.C. § 119 (e) of U.S. Provisional Application No. 63/227,483 filed Jul. 30, 2021, the entire contents of which is hereby incorporated herein by reference.

FIELD

This invention generally relates to a method of manufacturing cathode active materials for use in an electrochemical cell, such as a battery. More specifically, the present disclosure describes a method for producing high nickel or nickel-rich lithiated metal oxides.

BACKGROUND

The statements in this section merely provide background information related to the present disclosure and may not constitute prior art.

In conventional processes used to manufacture lithium ion batteries, high nickel cathode materials, such as $Li_xNi_yCo_zM_{(1-y-z)}O_2$, where M is aluminum (Al) and/or manganese (Mn), $x \geq 0.8$, and $y \leq 0.15$, are required to be produced using lithium hydroxide (LiOH) as the lithium source in an oxygen ($O_2$) environment at a high temperature (e.g., $\geq 700°$ C.). In a typical production process, Ni(II) sulfate, Co(II) sulfate, Al (III) sulfate, and/or Mn (II) sulfate is dissolved in water and then co-precipitated upon the addition of a mixture of sodium hydroxide and ammonium hydroxide. The hydroxide materials that precipitate are then washed, dried, and blended with $LiOH*H_2O$. The resulting blend or mixture is sintered at 750° C. in an $O_2$ environment to form the lithiated high nickel metal oxides.

In this process, $O_2$ is necessary because the nickel in the lithiated metal oxide needs to be at a high oxidation state (e.g., $Ni^{3+}$), while the starting Ni (II) sulfate precursor includes nickel with an oxidation state of $Ni^{2+}$. It is very difficult to oxidize $Ni^{2+}$ to $Ni^{3+}$ at high temperature, so a high partial pressure of $O_2$ is required during the sintering process. This is also one of the main reasons that LiOH is selected for use instead of another lithium precursor, such as $Li_2CO_3$. If $Li_2CO_3$ were used, it would release $CO_2$ during sintering, which would lower the $O_2$ partial pressure, thereby, resulting in an increased content of intermixed $Ni^{2+}$ and $Li^+$ ions in the resulting metal oxide.

LiOH is also typically used because of its low melting point (i.e., about 462° C.). A process using LiOH is able to form a fully lithiated metal oxide at a relatively low temperature (700-800° C.) because the melted LiOH helps facilitate the lithiation reaction by increasing the contact area between the lithium salt and the mixed metal oxide particles. In comparison, the melting point for $Li_2CO_3$ is 723° C. and a sintering temperature >800° C. would be required if lithium carbonate was used as the lithium salt.

In addition, the sintering temperature of the process cannot be maintained at a high level because high nickel lithiated metal oxides exhibit poor thermal stability. More specifically, the high nickel lithiated metal oxides will decompose at high temperatures to form $Li_{(1-x)}Ni_{(1+x)}O_2$ and release $O_2$. Thus, LiOH is typically selected over $Li_2CO_3$ for use in the commercial production of high nickel lithium metal oxide cathode materials because of the lower sintering temperature and freedom from the generation of $CO_2$ during sintering.

Unfortunately, at the sintering temperatures that are commonly used in a production process, the LiOH is highly corrosive to the metal components of the furnace and the crucible. The resulting corrosion rates encountered during production typically result in a significant and undesirable increase in production costs. In order to increase efficiency and lower production costs, the replacement of LiOH with a non-corrosive salt would be desirable.

SUMMARY

This disclosure relates generally to a method of manufacturing cathode active materials for use in an electrochemical cell, such as a battery. More specifically, the present disclosure describes a method for producing high nickel or nickel-rich lithiated metal oxides.

The method for preparing high nickel lithiated metal oxides generally comprises:
a. Selecting one or more nickel precursors;
b. Providing at least one non-corrosive lithium salt;
c. Delivering a plurality of metal oxide or hydroxide precursors;
d. Mixing the one or more nickel precursors, the at least one non-corrosive lithium salt, and the plurality of metal oxide/hydroxide precursors together to form a mixture comprising:

$$Li_xNi_yM_zN_{(1-y-z)}O_{(2-a)}Fa \qquad (F-1)$$

wherein x=1.0-1.1, $0.80 \leq y \leq 0.90$, $0.03 < z \leq 0.15$, and $0 \leq a \leq 0.05$, M is Co or Fe; and N is Al, Mn, Fe, Ca, Mg, Ti, Cr, Nb, Mo, W, B, or a mixture thereof, provided N may be Fe when M is Co;
e. Sintering in a $1^{st}$ sintering step, the mixture in an air environment at a temperature $\geq 750°$ C. to form a powder;
f. Sintering in a $2^{nd}$ sintering step, the powder in an $O_2$ environment at a temperature $\leq 750°$ C. to form the high nickel lithiated metal oxides.

According to another aspect of the present disclosure, a cathode active material for use in a battery comprises a material formed according to the process described above and further defined herein whose composition is described according to formula (F-1).

According to yet another aspect of the present disclosure, a lithium ion or lithium battery is provided that comprises the cathode active material having a composition according to formula (F-1).

Further areas of applicability will become apparent from the description provided herein. It should be understood that the description and specific examples are intended for purposes of illustration only and are not intended to limit the scope of the present disclosure.

DESCRIPTION OF THE DRAWINGS

In order that the disclosure may be well understood, there will now be described various forms thereof, given by way of example, reference being made to the accompanying drawings. The components in each of the drawings may not necessarily be drawn to scale, but rather emphasis is placed upon illustrating the principles of the invention.

The drawings described herein are for illustration purposes only and are not intended to limit the scope of the present disclosure in any way. It should be understood that throughout the description and drawings, corresponding reference numerals indicate like or corresponding parts and features.

DETAILED DESCRIPTION

The following description is merely exemplary in nature and is in no way intended to limit the present disclosure or its application or uses. For example, the high nickel or nickel-rich lithiated metal oxides prepared and used according to the teachings contained herein are described throughout the present disclosure as cathodic active materials used in conjunction with a battery in order to more fully illustrate the structural elements and the use thereof. The incorporation and use of such high nickel lithiated metal oxides in other applications, including without limitation as at least part of an electrode in other electrochemical cells is contemplated to be within the scope of the present disclosure.

For the purpose of this disclosure, the terms "about" and "substantially" are used herein with respect to measurable values and ranges due to expected variations known to those skilled in the art (e.g., limitations and variability in measurements).

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one metal", "one or more metals", and "metal(s)" may be used interchangeably and are intended to have the same meaning.

Figure 1:
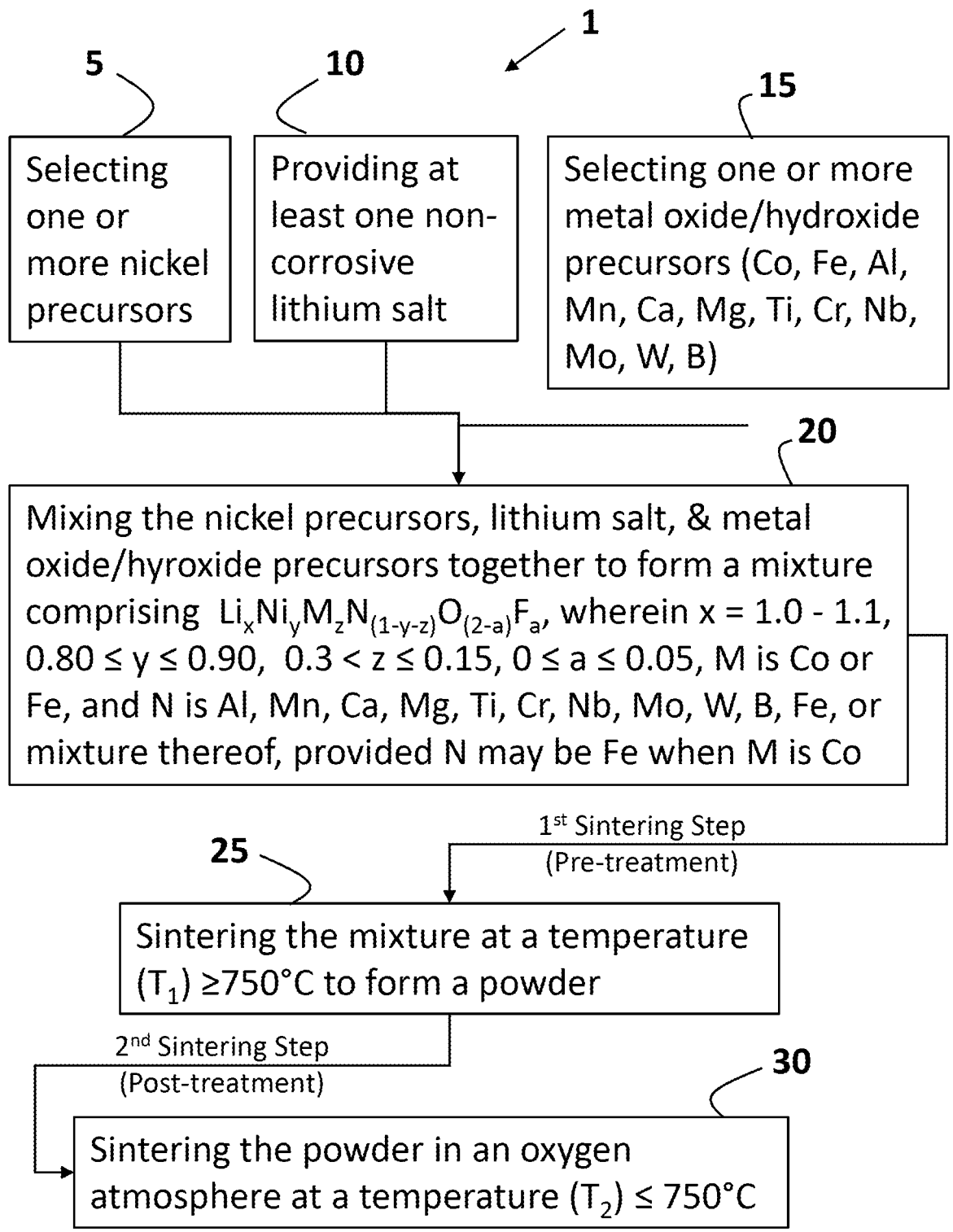
FIG. 1 is a flowchart illustrating a two-step sintering process for producing high nickel or nickel-rich lithiated metal oxides according to the teachings of the present disclosure.

The present disclosure generally provides a two-step process for producing high nickel or nickel-rich lithium metal oxides for use as cathode active materials using one or more non-corrosive lithium salts. Referring to FIG. 1, this process 1 comprises selecting 5 one or more nickel precursors, providing 10 at least one non-corrosive lithium salt, and delivering 15 a plurality of metal oxide/hydroxide precursors, such that at least one of the metal oxide/hydroxide precursors comprises cobalt (Co), iron (Fe) or a combination thereof and at least another metal precursor includes aluminum (Al), manganese (Mn), calcium (Ca), magnesium (Mg), titanium (Ti), chromium (Cr), niobium (Nb), molybdenum (Mo), tungsten (W), boron (B), or a combination thereof.

The one or more nickel precursors, the at least one non-corrosive lithium salt, and the plurality of metal oxide/hydroxide precursors are mixed 20 together to form a mixture that comprises, consists of, or consists essentially of the following formula (F-1):

$$Li_xNi_yM_zN_{(1-y-z)}O_{(2-a)}Fa, \qquad (F\text{-}1)$$

wherein x is in the range of 1.0-1.1, 0.80≤y≤0.90, 0.03<z≤0.15, and 0≤a≤0.05; M is Co or Fe; and N is Al, Mn, Fe, Ca, Mg, Ti, Cr, Nb, Mo, W, B, or a combination thereof, provided N may be Fe when M is Co. Alternatively, in formula (F-1), 0.80≤y≤0.87; alternatively, 0.80≤y≤0.85. Fluorine (F) may be present purposely or included as an impurity. Alternatively, F may be absent, i.e., a=0, and formula (F-1) may be written as $Li_xNi_yM_zN_{(1-y-z)}O_2$. The N in formula (F-1) may alternatively be Al, Mn, Fe, Mo, or a combination thereof. When Al and Mn is present as a combination, the molar ratio of Al:Mn may range from 0.99/0.01 to 0.01/0.99; alternatively, in the range from 0.2/0.8 to 0.8/0.2; and alternatively, in the range from 0.3/0.7 to 0.7/0.3. When Al, Mn, and either Mo or Fe are present as a combination, the ratio of Al to Mn to Fe or Mo [Al:Mn:(Fe—Mo)] may range from 0.99/0.05/0.05 or 0.05/0.99/0.05 or 0.05/0.05/0.99. Alternatively, the ratio of Al:Mn:(Fe or Mo) is in the range from 0.1/0.8/0.1 or 0.8/0.1/0.1 or 0.1/0.1/0.8, and alternatively, in the range from 0.15/0.7/0.15 or 0.7/0.15/0.15 or 0.15/0.15/0.7.

The non-corrosive lithium salt may be selected to be lithium acetate, lithium nitrate, lithium oxalate, lithium carbonate, or a mixture thereof. Alternatively, the non-corrosive salt is lithium carbonate ($Li_2CO_3$).

The cobalt or iron precursors (M) may include, without restriction, $Co_3O_4$, CoO, $Co(OH)_2$, CoOOH, cobalt carbonate, cobalt acetate, cobalt oxalate, cobalt nitrate, $Fe_3O_4$, $Fe_2O_3$, FeO, FeOOH, $Fe(OH)_3$, $Fe(OH)_2$, iron carbonate, iron acetate, iron oxalate, iron nitrate, or similar materials. Alternatively, the cobalt or iron precursors may include $Co_3O_4$, CoO, $Fe_3O_4$, or $Fe_2O_3$. Alternatively, the cobalt precursor is $Co_3O_4$. The iron precursors may also be used for N when M is Co.

The other metal oxide or metal hydroxide precursors (N) that may be used include for example, without limitation, $Al_2O_3$, $Al(OH)_3$, aluminum acetate, aluminum carbonate, aluminum oxalate, aluminum ethoxide, aluminum propyl oxide, aluminum butyl oxide, $B_2O_3$, $B_2O_5$, $H_3BO_3$, boron acetate, and borates. The metal oxide or metal hydroxide precursors may be a metal oxide, a metal hydroxide, or a metallic compound that decomposes into either a metal oxide or a metal hydroxide. Alternatively, the metal oxide or metal hydroxide precursors (N) comprise, $Al(OH)_3$, and/or $H_3BO_3$.

The nickel precursors may comprise, but not be limited to nickel oxide, nickel hydroxide, nickel oxyhydroxide, nickel acetate, nickel carbonate, nickel oxalate. When desirable, the nickel oxide may be formed from decomposing Ni$(NO_3)_2*6H_2O$ at a high temperature for an amount of time that is in the range of 3-6 hours; alternatively, about 4-5 hours. Alternatively, the nickel precursor is nickel oxide.

The nickel precursors, non-corrosive lithium salts, and the metal oxide/hydroxide precursors may be mixed using a batch or continuous mixing system, including, for example, without limitation a ball mill, an attritor mill, a jet mill, a plowshare mixer, or like equipment. Alternatively, the materials are mixed using a ball mill with a liquid medium (e.g., water) at a solid/liquid ratio of about ⅙ with 1-20 mm beads (oxide/beads mass ratio ⅓) for a period of 1-24 hours; alternatively, about 5 hours. Alternatively, the materials are mixed using a ball mill without a liquid medium at an oxide/bead ratio ranged from 1/1 to 1/20 and bead sizes ranged from 1 mm to 20 mm for a period of 1-24 hours. Alternatively, the materials are mixed by blending them together without any beads for a period of 1-24 hours.

After mixing, the mixture is collected and dried by any means known to one skilled in the art, including, but not limited to filtering and subjecting to a thermal environment, such as in an oven, to remove any liquid or moisture. Alternatively, the mixture may be spray dried by conventional methods known to one skilled in the art.

Referring once again to FIG. 1, a first ($1^{st}$) sintering or pre-sintering step is performed 25 by exposing the mixture of non-corrosive lithium salts, the nickel precursors, and the metal oxide/hydroxide precursors to a high temperature in order to decompose the non-corrosive lithium salt and form a lithiated metal oxide with high degree of $Li^+/Ni^{2+}$ mixing content. The temperature of this $1^{st}$ sintering step is generally greater than or equal to 750° C.; alternatively, ≥800° C.; or alternatively, ≥850° C.; alternatively, in the range of. is ≥750° C. and ≤1000° C.; alternatively, between is ≥800° C. and ≤950° C.; alternatively, between ≥850° C. and ≤900° C. The sintering environment for the pre-sintering step may be air, while the length of time for the $1^{st}$ sintering step is in the range of 2 hours to 24 hours; alternatively, between about 5 hours and 20 hours; alternatively, in the range of 7 hours and 15; alternatively, about 10 hours.

Still referring to FIG. 1, after the pre-sintering or $1^{st}$ sintering step, the lithiated metal oxide is then treated by further sintering 30 in a second ($2^{nd}$) sintering or post-treatment step in an $O_2$ environment at a relatively low temperature to oxidize any remaining $Ni^{2+}$ to $Ni^{3+}$ and to re-organize the distribution of $Ni^{3+}$ in the nickel-rich lithium metal oxides to reduce the mixing content of $Li^+/Ni^{2+}$. The sintering temperature for this $2^{nd}$ sintering step is generally, ≤750° C.; alternatively, between ≤750° C. and ≥700° C. For the purpose of this disclosure an $O_2$ environment refers to an environment wherein the partial pressure of $O_2$ is greater than that found in air. Alternatively, the oxygen environment may be pure $O_2$. The length of time for the $2^{nd}$ sintering step is in the range of 2 hours to 24 hours; alternatively, between about 5 hours and 20 hours; alternatively, in the range of 7 hours and 15; alternatively, about 10 hours. According to one aspect of the present disclosure, the sintering time of the $2^{nd}$ sintering step is longer than the sintering time of the $1^{st}$ sintering step.

The high nickel lithiated metal oxides are characterized using x-ray diffraction with measurements being conducted on a benchtop Rigaku x-ray machine equipped with Cu Kα radiation using an operating voltage of 30 kV and a current of 15 mA. The x-ray diffraction (XRD) peak ratio of (003)/(104) is used as an index for the mixing content of $Li^+/Ni^{2+}$. The higher the peak ratio of (003)/(104) indicates a lower content of cation mixing between $Li^+$ and $Ni^{2+}$, which infers a better electrochemical performance. The (003) peak occurs from the diffraction of a layered rock-salt structure, while the (104) peak appears due to both the diffraction of layered and cubic rock-salt structures. When Lit and $Ni^{2+}$ ions are mixed completely, the intensity of the (003) reflection should be zero.

The high nickel lithiated metal oxide may have a nickel (Ni) content that is in the range of about 80 mole % to less than 90 mole % relative to the total metal content present in the nickel-rich lithiated metal oxides. Alternatively, the nickel content is between 80 mole % and 85 mole %. The cobalt (Co) and/or iron (Fe) content is between 1 mole % and 20 mole % relative to the total metal content present in the nickel-rich lithiated metal oxides. Alternatively, the cobalt or iron content is between 5-15 mole %.

The specific examples provided in this disclosure are given to illustrate various embodiments of the invention and should not be construed to limit the scope of the disclosure. The embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Example 1. Preparation and Testing of $LiNi_{0.8}Co_{0.15}Al_{0.05}O_2$ (NCA80) and $LiNi_{0.9}Co_{0.05}Al_{0.05}O_2$ (NCA90)

Over 100 grams of Nickel oxide (NiO) was produced by decomposing $Ni(NO_3)_2 \ast 6H_2O$ at 600° C. in an air environment for 4 hours. For $LiNi_{0.8}CO_{0.15}Al_{0.05}O_2$ (NCA80), 19.40 grams of $Li_2CO_3$, 29.88 grams of NiO, 6.02 grams of $Co_3O_4$, and 1.95 grams of $Al(OH)_3$ were ball-milled for 5 hours with a solid/water mass ratio of 4/6 and an oxide/bead mass ratio of 1/3. For making $LiNi_{0.9}Co_{0.05}Al_{0.05}O_2$ (NCA90), 33.61 grams of NiO was ball milled with 19.40 grams of $Li_2CO_3$, 2.01 grams of $Co_3O_4$, and 1.95 grams of $Al(OH)_3$ in water for 5 hours. The solid/water mass ratio was 4/6. The milled slurry was then spray-dried. The dried powder was sintered under various conditions as described in Table 1.

Figure 2A:
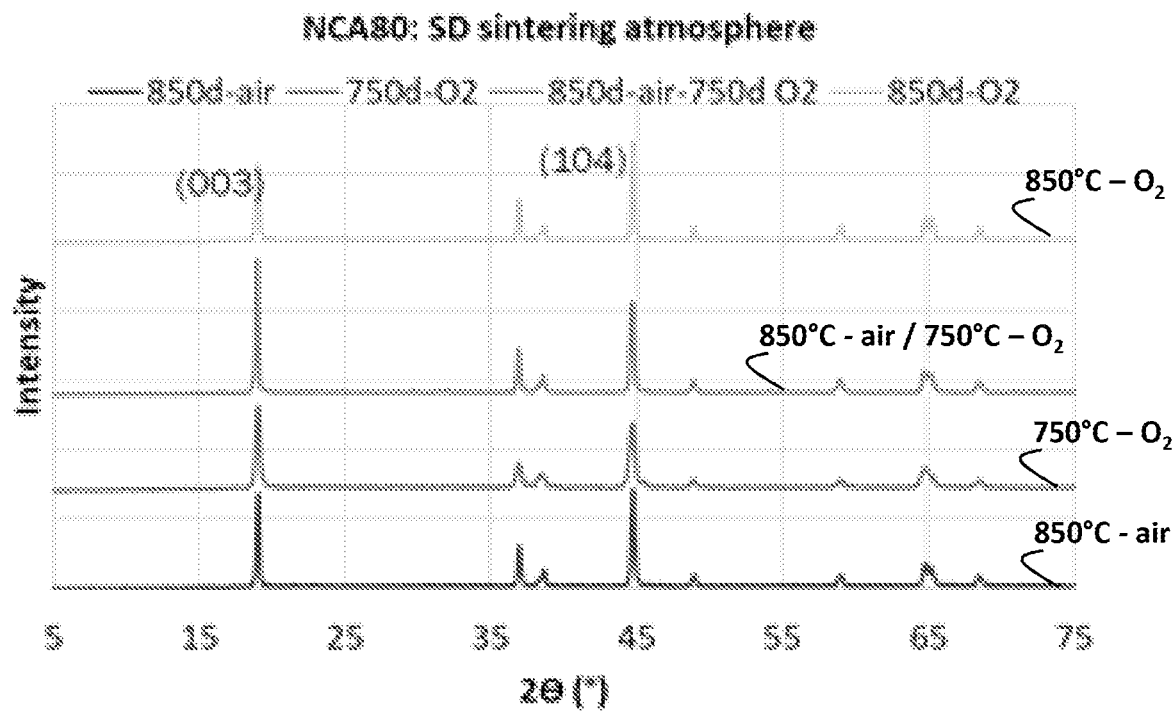
FIGS. 2A and 2B shows x-ray diffraction (XRD) patterns measured for NCA80 (FIG. 2A) and NCA90 (FIG. 2B) prepared according to the teachings of the present disclosure and sintered under different conditions.
Figure 2B:
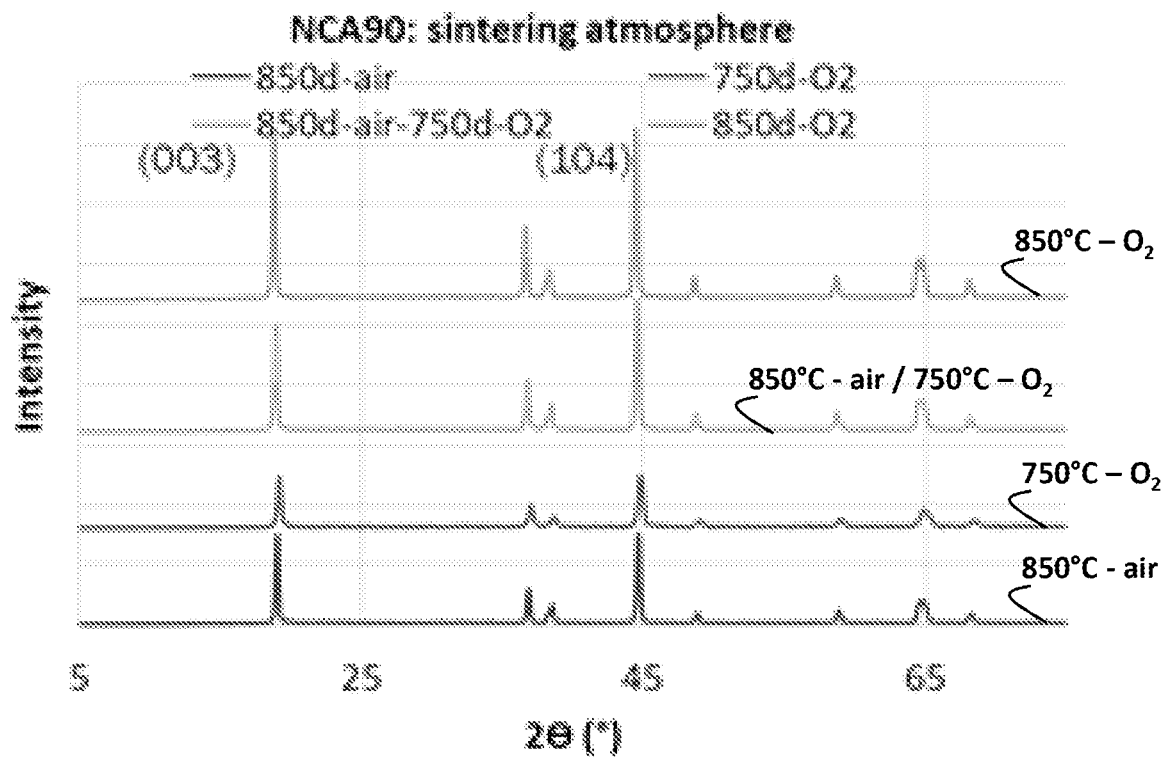

The x-ray diffraction (XRD) peak ratio of (003)/(104) was also measured for the resulting high nickel lithiated meal oxides as shown in Table 1. The x-ray diffraction (XRD) patterns measured for NCA80 and NCA90 are also provided in FIGS. 2A and 2B for comparison. The NCA80 sample comprised 80 mole % nickel as compared to all non-lithium metals, while the NCA90 sample contained 90 mole % nickel as compared to non-lithium metals.

TABLE 1

Sintering conditions and peak ratio (003)/(104) for NCA80 and NCA90.

| | Sintering conditions | peak ratio (003)/(104) |
|---|---|---|
| NCA80 | 850° C. in air (10 hrs) | 0.95 |
| | 750° C. in $O_2$ (10 hrs) | 1.25 |
| | 850° C. in air (10 hrs) and then 750° C. in $O_2$ (10 hrs) | 1.47 |
| | 850° C. in $O_2$ (10 hrs) | 0.77 |
| NCA90 | 850° C. in air (10 hrs) | 0.99 |
| | 750° C. in $O_2$ (10 hrs) | 0.98 |
| | 850° C. in air (10 hrs) and then 750° C. in $O_2$ (10 hrs) | 0.82 |
| | 850° C. in $O_2$ (10 hrs) | 0.99 |

As shown in Table 1, the peak ratio between (003)/(104) was the highest for the NCA80 sample (80 mole % Nickel) with a pre-sintering step performed in an air environment (850° C.) followed by a $2^{nd}$ post-treatment sintering step in an $O_2$ environment (750° C.). When the sintering step was performed only in air (850° C.), the NCA80 sample showed a lower peak ratio of (003)/(104) than the sample treated in $O_2$ sintered at a lower temperature of 750° C. (i.e., compare 0.95 vs. 1.25). This result is expected because of the decrease of $O_2$ partial pressure that occurs when sintered in air. When sintered only in $O_2$, the sample treated at 850° C. showed a lower peak ratio of (003)/(104) than the sample treated at 750° C. This result is also expected due to the poor thermal stability of the high nickel lithiated metal oxides.

For the sample sintered at 850° C. and then treated in $O_2$ at 750° C., its (003)/(104) peak ratio was 1.47, which was higher than the samples sintered at 750° C. or 850° C. in $O_2$. This result confirms that the $O_2$ treatment at 750° C. has oxidized the $Ni^{2+}$ impurity from the 850° C. air-sintered sample, and even more, the Li/Ni mixing level is lower than the samples sintered in $O_2$. Thus, the use of a post-treatment ($2^{nd}$) sintering step in $O_2$ at a lower temperature than in the $1^{st}$ pre-sintering step reduces the $Li^+/Ni^{2+}$ mixing and redistributes the $Ni^{3+}$ ions.

Still referring to Table 1, the effect from the post-treatment in $O_2$ was not observed to be the same when the Ni content was increased to 90 mole % (see NCA90). In this case, the use of a post-treatment in $O_2$, actually decreased the (003)/(104) peak ratio to a value that is even lower than the value measured for the sample sintered in air (compare 0.82 vs 0.99). This result suggests that at this concentration of nickel a two-step sintering process is not effective for maintaining a low $Li^+/Ni^{2+}$ mixing level.

Example 2—Further Preparation and Testing of $LiNi_{0.8}Co_{0.15}Al_{0.05}O_2$ (NCA80)

NCA80 was made with the same conditions as the material discussed in Example 1 except that the $1^{st}$ sintering temperature was 800° C. instead of 850° C. The dried powder was finally sintered under various conditions described in Table 2. The X-ray diffraction (XRD) peak ratio of (003)/(104) was also measured for the resulting high nickel lithiated meal oxides as shown in Table 2. The NCA80 sample comprised 80 mole % nickel.

The x-ray diffraction (003)/(104) peak ratios show in Table 2 exhibit the same trend as observed in Table 1. The sample sintered with a $1^{st}$ sintering step in air (800° C.) and a $2^{nd}$ step of $O_2$ sintering (750° C.) exhibited a much higher (003)/(104) XRD peak ratio than the sample sintered with a single air (800° C.) sintering step (compare 1.31 vs 0.95). In fact, the (003)/(104) peak ratio in this Example 2 was even higher than the two NCA80 samples sintered at a higher temperature (850° C.) in pure $O_2$ as shown in Table 1.

Figure 3:
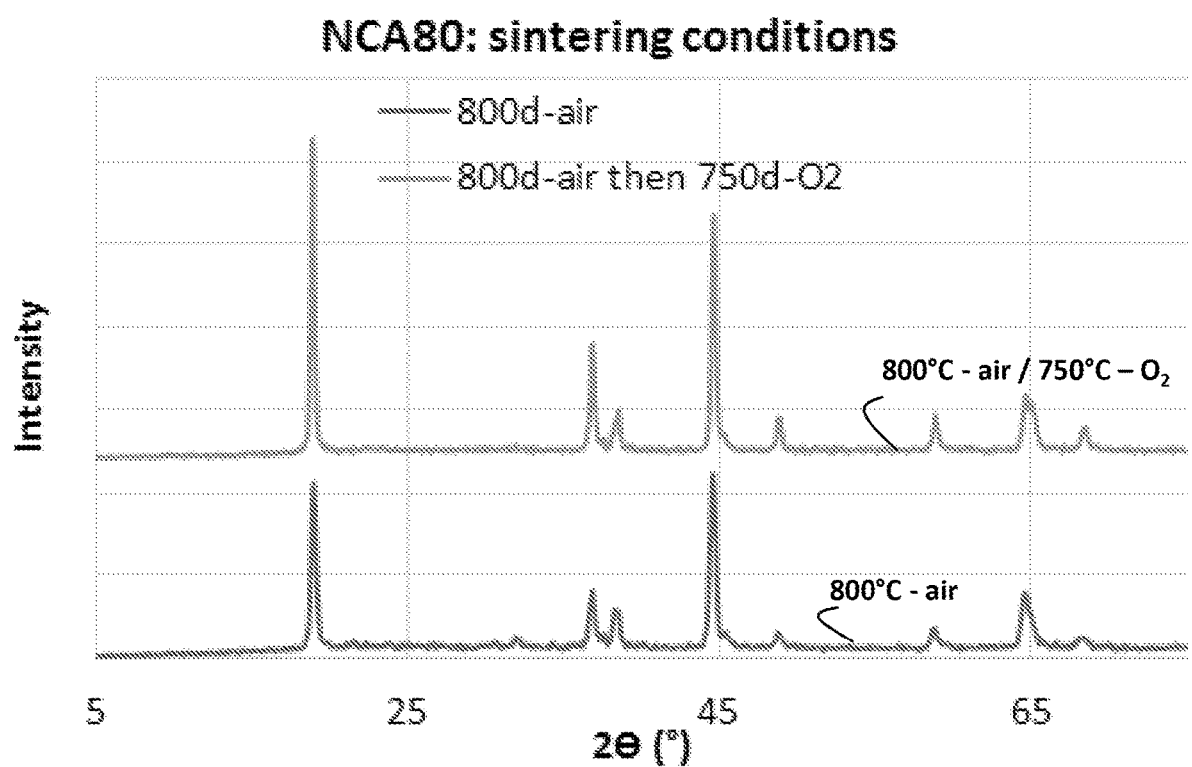
FIG. 3 shows additional x-ray diffraction (XRD) patterns measured for NCA80 sintered using a $1^{st}$ sintering step (800° C.) in an air environment with and without exposure to a $2^{nd}$ sintering step (750° C.) in an oxygen ($O_2$) environment.
Figure 4:
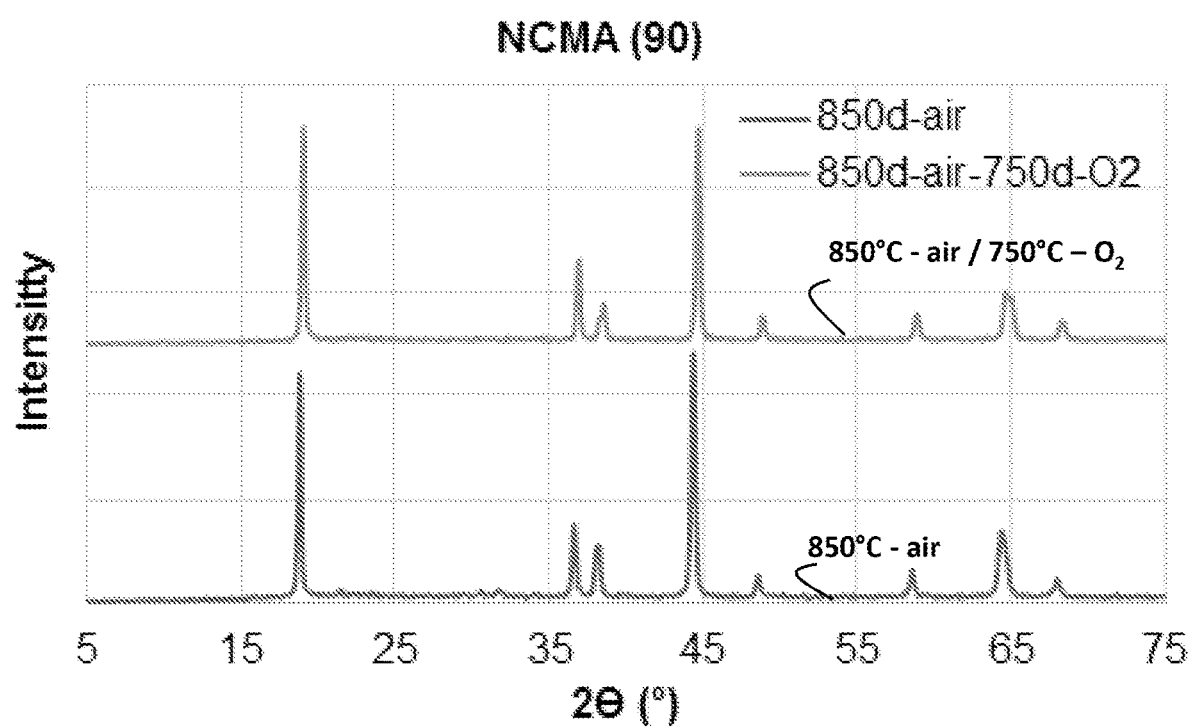
FIG. 4 shows other x-ray diffraction (XRD) patterns for NCMA90 sintered using a $1^{st}$ sintering step (800° C.) in an air environment with and without exposure to a $2^{nd}$ sintering step (750° C.) in an oxygen ($O_2$) environment.

The x-ray diffraction (XRD) patterns for NCA80 sintered under the different conditions are also provided in FIG. 3 for comparison. This comparison demonstrates the peak intensity difference that exists between the two NCA80 samples. Both samples did not show any presence of impurity phases from $Li_2O/Li_2CO_3$.

TABLE 2

Sintering conditions and the peak ratio (003)/(104) for NCA80

| | Sintering conditions | peak ratio (003)/(104) |
|---|---|---|
| NCA80 | 800° C. in air (10 hrs) | 0.95 |
| | 800° C. in air (10 hrs) and then 750° C. in $O_2$ (10 hrs) | 1.31 |

Example 3-Preparation and Testing of $Li_{1.05}Ni_{0.9}Co_{0.05}Al_{0.02}Mn_{0.025}B_{0.005}O_2$ (NCMA90)

Nickel oxide (NiO) (~325 mesh, 99%) was purchased from Sigma Aldrich in USA. The NCMA90 sample was prepared by ball milling 38.8 grams of $Li_2CO_3$, 67.22 grams of NiO, 4.01 grams of $Co_3O_4$, 1.56 grams of $Al(OH)_3$, and 0.309 grams of $H_3BO_3$ in water. The solid/water mass ratio was 4/6. A total of 160 grams of 2 mm ceramic beads were added into the dispersion and the dispersion was milled for 5 hours. The targeted composition is $Li_{1.05}Ni_{0.9}Co_{0.05}Al_{0.02}Mn_{0.025}B_{0.005}O_2$. A slight excess of lithium carbonate was added to compensate for the loss of lithium expected to occur during the sintering process.

After milling, the dispersion was spray dried with a benchtop spray drier. After drying, the powder was first sintered in air at 500° C. for 2 hours and then 850° C. for 10 hours. The air-sintered powder was then transferred into a glass tube and sintered again at 750° C. for 10 hours with flowing pure $O_2$. X-ray diffraction (XRD) patterns were measured using a benchtop Rigaku X-ray machine.

The sintering conditions and the corresponding (003)/(104) peak ratio are shown in Table 3. The NCMA90 sample exposed to the pure $O_2$ post-treatment sintering step exhibited an increase in the (003)/(104) peak ratio as compared to the sample sintered only in air (compare 0.91→1.01). This example demonstrates that the use of a pure $O_2$ post-treatment could increase the (003)/(104) peak ratio even at 90 mole % of Ni content, although the value for the (003)/(104) peak ratio is not at the same level as observed for samples having lower Ni content (see NCA80 in Tables 1 & 2).

TABLE 3

Sintering conditions and the peak ratio (003)/(104) for NCMA90

| | Sintering conditions | peak ratio (003)/(104) |
|---|---|---|
| NCMA90 | 850° C. in air (10 hrs) | 0.91 |
| | 850° C. in air (10 hrs) and then 750° C. in $O_2$ (10 hrs) | 1.01 |

According to another aspect of the present disclosure a cathode active material for use in an electrochemical cell is described. This material, which is formed according to the process described above and in FIG. 1 generally comprises the formula described by formula F-1. The electrochemical cell may be selected to be a lithium ion or lithium battery with the cathode active material or high nickel lithiated metal oxides being used for at least part of one of the electrodes.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A process for preparing high nickel lithiated metal oxides, the process comprising:
   a. Selecting one or more nickel precursors;
   b. Providing at least one non-corrosive lithium salt;
   c. Delivering a plurality of metal oxide or hydroxide precursors; wherein at least one of the metal oxide/hydroxide precursors comprises cobalt (Co), iron (Fe) or a combination thereof and at least another metal oxide/hydroxide precursor includes aluminum (Al), manganese (Mn), calcium (Ca), magnesium (Mg), titanium (Ti), chromium (Cr), niobium (Nb), molybdenum (Mo), tungsten (W), boron (B), or a combination thereof;
   d. Mixing the one or more nickel precursors, the at least one non-corrosive lithium salt, and the plurality of metal oxide/hydroxide precursors together to form a mixture;
   e. Spray drying the mixture to form a powder; and
   f. Subjecting the powder to a $1^{st}$ sintering step and then to a $2^{nd}$ sintering step to form the high nickel lithiated metal oxides comprising:

$$Li_xNi_yM_zN_{(1-y-z)}O_{(2-a)}F_a \quad \text{(F-1)}$$

wherein x=1.0-1.1, 0.80≤y≤0.90, 0.03<z≤0.15, and 0≤a≤0.05, M is Co or Fe; and N is Al, Mn, Fe, Ca, Mg, Ti, Cr, Nb, Mo, W, B, or a mixture thereof, provided N may be Fe when M is Co;
   wherein the $1^{st}$ sintering step is performed in an air environment at a temperature ≥750° C.; and
   wherein the $2^{nd}$ sintering step is performed in an $O_2$ environment at a temperature ≤750° C.

2. The process according to claim 1, wherein the M in formula (F-1) is cobalt.

3. The process according to claim 2, wherein the y in formula (F-1) is 0.80≤y≤0.87.

4. The process according to claim 3, wherein the y in formula (F-1) is 0.80≤y≤0.85.

5. The process according to claim 2, wherein N in formula (F-1) is Al.

6. The process according to claim 2, wherein N in formula (F-1) is Mn.

7. The process according to claim 2, wherein N in formula (F-1) is Al and Mn with a molar ratio of Al/Mn ranging from 0.99/0.01 to 0.01/0.99.

8. The process according to claim 2, wherein N in formula (F-1) is Al, Mn, and either Fe or Mo with a molar ratio of Al/Mn/(Fe—Mo) ranging from 0.99/0.05/0.05 to 0.05/0.99/0.05 to 0.05/0.05/0.99.

9. The process according to claim 1, wherein the $O_2$ environment of the $2^{nd}$ sintering step is pure oxygen.

10. The process according to claim 1, wherein the $1^{st}$ sintering step has a temperature that is ≥750° C. and ≤1000° C.

11. The process according to claim 10, wherein the temperature in the $1^{st}$ sintering step is ≥800° C. and ≤950° C.

12. The process according to claim 11, wherein the temperature in the $1^{st}$ sintering step is ≥850° C. and ≤900° C.

13. The process according to claim 1, wherein the $1^{st}$ sintering step is performed with a sintering time that is in a range of 2 hours to 24 hours.

14. The process according to claim 1, wherein the temperature in the $2^{nd}$ sintering step is ≤750° C. and ≥700° C.

15. The process according to claim 14, wherein the $2^{nd}$ sintering step is performed with a sintering time that is in a range of 2 hours to 24 hours.

16. The process according to claim 14, wherein the sintering time of the $2^{nd}$ sintering step is longer than the sintering time of the $1^{st}$ sintering step.

* * * * *